United States Patent [19]

Webber

[11] Patent Number: 5,219,683
[45] Date of Patent: Jun. 15, 1993

[54] DIOL DIESTERS AND ALKOXYALKYLESTERS AS SOLVENTS FOR NONAQUEOUS BATTERY ELECTROLYTES

[75] Inventor: Andrew Webber, Avon Lake, Ohio

[73] Assignee: Eveready Battery Company, Inc., St. Louis, Mo.

[21] Appl. No.: 846,746

[22] Filed: Mar. 6, 1992

Related U.S. Application Data

[63] Continuation of Ser. No. 562,014, Aug. 2, 1990, abandoned.

[51] Int. Cl.$^5$ ............................................. H01M 6/14
[52] U.S. Cl. .................................. 429/197; 429/194; 429/218
[58] Field of Search .................................. 429/194, 197

[56] References Cited

U.S. PATENT DOCUMENTS

| | | | |
|---|---|---|---|
| 3,393,093 | 7/1968 | Shaw et al. | 136/6 |
| 4,008,357 | 2/1977 | Nishimura et al. | 429/142 |
| 4,753,859 | 6/1988 | Brend et al. | 429/197 |
| 4,786,499 | 11/1988 | Slane et al. | 429/197 |
| 4,804,596 | 2/1989 | Ebner et al. | 429/197 |
| 4,952,330 | 8/1990 | Leger et al. | 429/197 |

FOREIGN PATENT DOCUMENTS

| | | | |
|---|---|---|---|
| 0165794 | 12/1985 | European Pat. Off. | 429/197 |
| 6117106 | 11/1977 | Japan . | |
| 0050772 | 3/1982 | Japan | 429/197 |
| 57-90877 | 6/1982 | Japan | 429/197 |

OTHER PUBLICATIONS

Aldrich Catalog/Handbook (1984–1985).

Primary Examiner—Asok Pal
Attorney, Agent, or Firm—Robert W. Welsh

[57] ABSTRACT

A new class of low flammability solvents for use in the electrolyte of a nonaqueous battery comprising a compound of the general formula $$Y-O-X-O-\overset{O}{\underset{\|}{C}}-R$$

in which R is a $C_1$–$C_{10}$ alkyl group, X is a $C_1$–$C_8$ acyclic group which can be linear, branched, saturated or unsaturated and Y is a $C_1$–$C_{10}$ alkyl group or a carbonyl group O $$R'\overset{O}{\underset{\|}{C}}$$

in which R' is a $C_1$–$C_{10}$ alkyl group. When Y is a carbonyl group a class of diesters is disclosed which are prepared from a dihydroxy alcohol and two molecules of a monocarboxylic acid. When Y is a $C_1$–$C_{10}$ alkyl group a class of ether-esters is disclosed. The preferred solvents are ethylene glycol diacetate and 2-ethoxyethylacetate. The solvents are preferably used in combination with a cosolvent such as propylene carbonate and most preferably employ additions of more volatile ether cosolvents such as dimethoxyethane or 1,3-dioxolane for increased discharge performance. Soluble salts used in the electrolyte solution are, for example, LiCF$_3$SO$_3$LiBF$_4$. The preferred lithium salt is LiCF$_3$SO$_3$.

17 Claims, 1 Drawing Sheet

DIOL DIESTERS AND ALKOXYALKYLESTERS AS SOLVENTS FOR NONAQUEOUS BATTERY ELECTROLYTES

This is a continuation of copending application Ser. No. 07/562,014 filed on Aug. 2, 1990, now abandoned.

BACKGROUND OF THE INVENTION

Nonaqueous batteries, particularly lithium batteries, have an excellent reputation for power output relative to size. A lithium cell requires the use of a nonaqueous electrolyte in view of the high chemical reactivity of the lithium. Certain ethers have been found to be very good solvents for use in electrolytes for lithium cells. For example, 1,2-dimethoxyethane is currently used in many lithium cells. Ethers are, however, relatively flammable materials. Others have investigated the use of aliphatic esters such as methyl acetate and methyl formate but these have also been found to be highly flammable. The stability of these materials towards lithium is also questionable.

In order to improve a lithium cell, it would be desirable to have a material with a high flash point or reduced flammability and also a material with a high boiling point to improve the upper operating temperature limit of the cell.

In U.S. Pat. No. 4,804,596, assigned to Honeywell, methyl formate and methyl acetate have been used as electrolyte solvents. However, these materials are highly flammable and the cells have very low operating temperature limits because of the low boiling point of the solvent.

Diesters derived from two alcohols and a dicarboxylic acid have been reported as solvents or cosolvents for lithium batteries (Hitachi's published unexamined Japanese Patent Applications Sho 52-142761 through Sho 52-142765). Our tests with several of the diesters have shown very poor results. Most cells failed to discharge and the electrolyte salts tend to be insoluble. Only mixtures of certain dialkyl succinates with propylene carbonate discharged to any practical degree.

SUMMARY OF THE INVENTION

In accordance with the present invention, it has been found that another family of diesters possessing low flammability and having a different structural formula perform well as electrolyte solvents, particularly in mixtures with a cosolvent, preferably propylene carbonate. These compounds are the reaction product of a diol with two monocarboxylic acids and have the following structure:

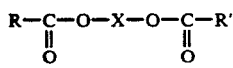

where R and R' are $C_1$-$C_{10}$ alkyl groups and X is an acyclic $C_1$-$C_8$ hydrocarbon group which can be linear or branched, saturated or unsaturated. Preferred structures are those in which R and R' are both $CH_3$ and X is —$CH_2$—$CH_2$—(ethylene glycol diacetate) or —$CH_2$ (methylene diacetate). These compounds can be used as sole solvents but cell outputs are lower than desired. For best cell performance they are preferably employed with cosolvents such as propylene carbonate (PC), 1,2-dimethoxyethane (DME) and 1,3-dioxolane (DIOX). Possible salts for use in the electrolyte solution include any soluble alkali or alkaline earth metal salt, e.g., a lithium salt such as $LiCF_3SO_3$, $LiAsF_6$, $LiClO_4$, $LiPF_6$, $LiBF_4$, $Li(CF_3SO_2)_2N$, etc. The preferred salt is $LiCF_3SO_3$.

Suitable active cathode materials useful with electrolyte solvents of this invention include iron sulfides such as $FeS_2$ and FeS, manganese oxides such as $MnO_2$, $V_2O_5$, $WO_3$, $MoO_3$, $MoS_2$, lead oxides, cobalt oxides, copper oxides, copper sulfides, $TiS_2$ and transition metal polysulfides.

Related to the above-described diesters derived from diols is another class of compounds in which one of the ester groups is replaced with an ether group giving electrolyte solvents with the following generic structure:

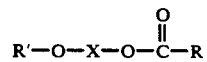

where R and R' are $C_1$-$C_{10}$ alkyl groups and X is an acyclic $C_1$-$C_8$ hydrocarbon group which can be linear or branched, saturated or unsaturated. The most preferred solvents are those in which R and R' are selected from $CH_3$ and $C_2H_5$ and X is selected from $CH_2$ and $CH_2$—$CH_2$.

The following generic formula includes both of the above-described groups of electrolyte solvents but excludes solvents previously reported for use in nonaqueous batteries which are derivatives of dicarboxylic acids. The generic structure is as follows:

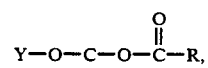

wherein:
R is a $C_1$-$C_{10}$ alkyl group;
X is a $C_1$-$C_8$ acyclic group which can be linear, branched, saturated or unsaturated; and
Y is a $C_1$-$C_{10}$ alkyl group or a carbonyl group

in which R' is a $C_1$-$C_{10}$ alkyl group.

The most preferred solvents are ethylene glycol diacetate (EGDiOAc) and 2-ethoxyethyl acetate (EtOEtOAc). The solvents are preferably used in combination with a cosolvent such as propylene carbonate and most preferably employ additions of more volatile ether cosolvents such as 1,2-dimethoxyethane or 1,3-dioxolane for increased discharge performance. Soluble salts used in the electrolyte solution are alkali and alkaline earth metal salts, for example lithium salts such as $LiCF_3SO_3$, $LiBF_4$, and $LiClO_4$. The preferred salt for lithium cells is $LiCF_3SO_3$.

DETAILED DESCRIPTION OF THE PREFERRED EMBODIMENTS

Figure 1:
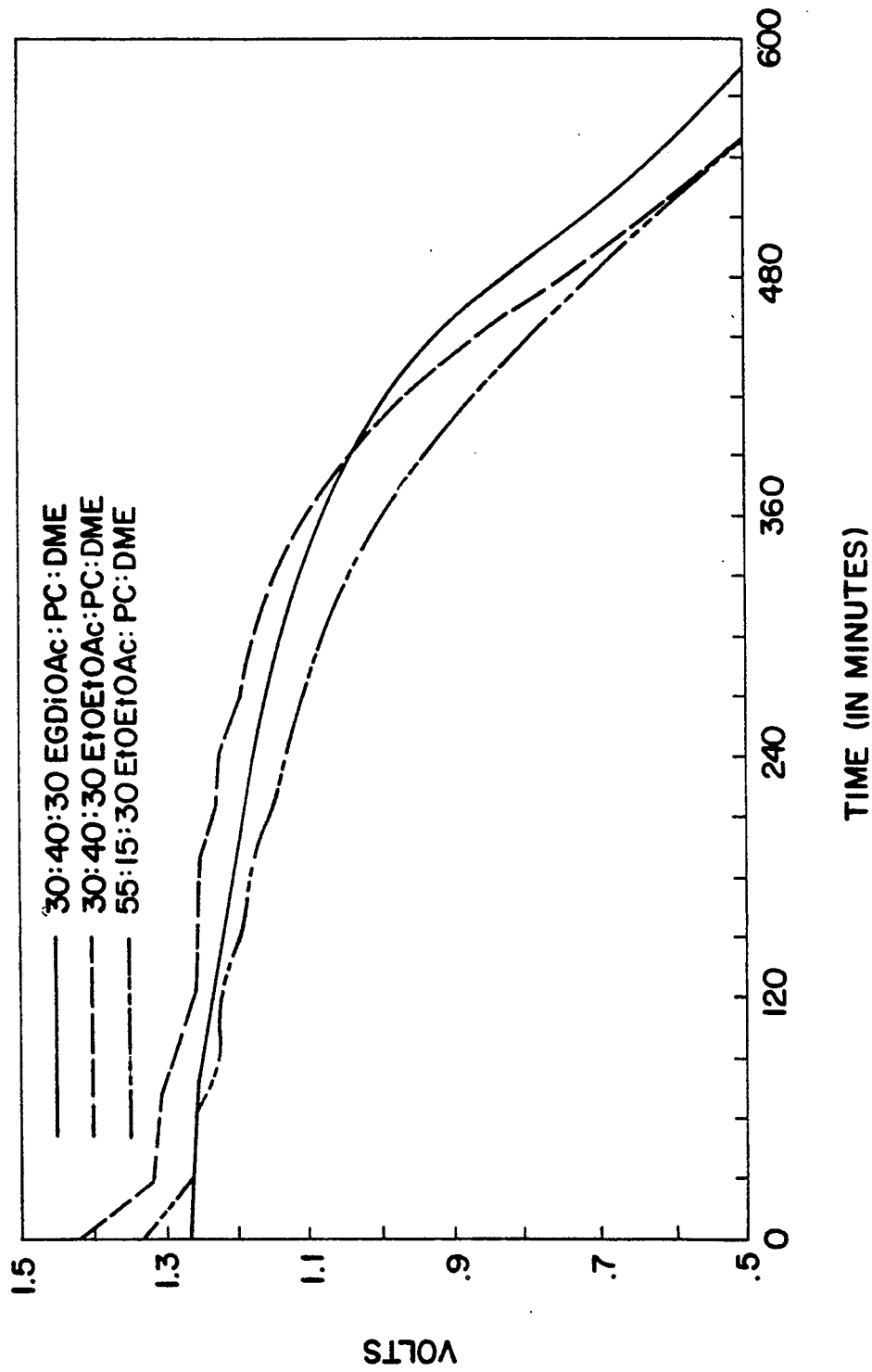
FIG. 1 shows the discharge curves for cells employing three electrolyte solvent compositions of the present invention.

In accordance with the present invention, a new family of diesters of low flammability having a different structure from that of diesters derived from dicarboxylic acids have been found to perform well as electrolyte solvents, particularly in mixtures with cosolvents. The compounds are a class of diesters prepared from the reaction of a diol and two monocarboxylic acid molecules and ether-esters obtained by replacing one of the ester groups in the diesters with an ether group. The two classes of electrolyte solvents can be described by the following generic formula:

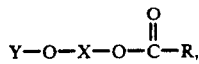

wherein: R is a $C_1$–$C_{10}$ alkyl group; X is a $C_1$–$C_8$ acyclic group which can be linear, branched, saturated or unsaturated; and Y is a $C_1$–$C_{10}$ alkyl group or a carbonyl group

in which R' is a $C_1$–$C_{10}$ alkyl group.

The compounds have been found to be particularly useful as solvents for the electrolyte in cells employing anodes of alkali or alkaline earth metals or their alloys, particularly lithium and its alloys. The compounds have low flammability and high boiling points. When the compounds were evaluated in lithium test cells, they were found to be effective solvents. When mixed in a 1:1 ratio with a cosolvent such as propylene carbonate, the electrolyte solvent was found to be substantially improved and more effective for use in lithium cells. The solvents were found to have lower flammability than the solvents conventionally used in lithium cells and higher boiling points, which should extend the upper operating temperature limit and improve the safety characteristics of the lithium cells.

EXAMPLES

The cells used to evaluate the electrolyte solvents were experimental Li/FeS₂ cells. These test cells were made with stainless steel containers and small disc electrodes (lithium anode: 0.625 inch diameter, 0.04 inch thick; FeS₂ cathode: 0.5938 inch diameter, 0.005 inch thick). The FeS₂ cathode mix, which consisted of 91 wt. % FeS₂, 2.0 wt. % zinc powder, 4.75 wt. % conductor (graphite and other carbons) and 2.25 wt. % polymeric binder, was cast on one side of an aluminum foil carrier (0.001 inch thick). The separator was composed of two layers (each 0.001 inch thick) of microporous polypropylene containing surfactants. The electrolyte volume was 1.5 ml. per cell. The particular arrangement or shape of the cell components forms no part of this invention. Several such experimental test cells were prepared and discharged with various combinations of electrolyte solvents. Each cell was discharged on a 300-ohm continuous load and the voltage and ampere-hour cathode efficiency of the cells were measured.

300-Ohm Discharge Data For Li—FeS₂ Experimental Cells

| Salt (1M') | Solvents(s) | FeS₂ Cathode % Efficiency to 1.0V | FeS₂ Cathode % Efficiency to 0.75V |
|---|---|---|---|
| Diesters derived from diols | | | |
| LiCF₃SO₃ | EGDiOAc | | Very low output |
| LiCF₃SO₃ | EGDiOAc/PC | 40 (46) | 70 (73) |
| LiBF₄ | EGDiOAc | | Very low output |

-continued
300-Ohm Discharge Data For Li—FeS₂ Experimental Cells

| Salt (1M') | Solvents(s) | FeS₂ Cathode % Efficiency to 1.0V | FeS₂ Cathode % Efficiency to 0.75V |
|---|---|---|---|
| LiBF₄ | EGDiOAc/PC | 45 (50) | 73 (78) |
| LiCF₃SO₃ | MDiOAc | | Very low output |
| LiCF₃SO₃ | MDiOAc/PC | 37 (44) | 50 (55) |
| LiBF₄ | MDiOAc | | Very low output |
| LiBF₄ | MDiOAc/PC | 47 (53) | 59 (65) |
| Ether-Esters | | | |
| LiCF3SO3 | MeOEtOAc | 11 (18) | 38 (59) |
| LiCF3SO3 | MeOEtOAc/PC | 51 (53) | 65 (69) |
| LIBF4 | MeOEtOAc | 29 (30) | 56 (61) |
| LIBF4 | MeOEtOAc/PC | 40 (53) | 66 (80) |
| LICF3SO3 | EtOEtOAc | 0 (0) | 15 (27) |
| LiCF3SO3 | EtOEtOAc/PC | 49 (65) | 68 (76) |
| LiBF4 | EtOEtOAc | 14 (24) | 41 (63) |
| LiBF4 | EtOEtOAc/PC | 49 (63) | 74 (80) |

% values are typically the average of 4 cells per lot; values in ( ) are those of the best cell from each lot
1M' = 1 mole of salt per liter of solvent As a result of the tests, it was found that several of the new family of compounds exhibited promise as solvents for electrolytes for use in lithium cells. The preferred diester solvents were found to be those where R and R' were $C_1$ to $C_4$ carbon groups and the most preferred were found when R and R' were methyl groups. In the ether-esters it was determined that the preferred solvents were those where R and R' were a $C_1$ to $C_4$ groups and; the most preferred were those compounds in which R and R' were methyl or ethyl groups.

The most preferred diesters were found to be ethylene glycol diacetate (flash point = 82° C.) and methylene diacetate (flash point = 73° C.). Both of these materials have flash points substantially higher than that of the commonly used 1,2-dimethoxyethane which has a flash point of 0° C. The most preferred ether-esters were found to be 2-ethoxyethyl acetate (flash point = 57° C.) and 2-methoxyethyl acetate (flash point = 43° C.). In terms of overall performance (cathode efficiency and operating voltage) the solvents can be ranked in the following order: 2-ethoxyethyl acetate > 2-methoxyethyl acetate > ethylene glycol diacetate > methylene diacetate.

In the experimental cells, each of the preferred electrolyte solvents was tested alone and with a cosolvent propylene carbonate. The addition of the cosolvent was found to substantially increase the cathode efficiency of the cell. For example, cells employing methoxyethyl acetate as the electrolyte solvent exhibited a cathode efficiency of approximately 11% to a 1.0 volt cutoff when no cosolvent was used and an efficiency of 51% when the electrolyte solvent was mixed at a 1:1 ratio with the cosolvent propylene carbonate. 2-Ethoxyethyl acetate-containing cells exhibited a cathode efficiency of 0 to the 1.0 volt cutoff (15% to a 0.75 volt cutoff) when used without a cosolvent and an efficiency of 49% to the 1.0 volt cutoff when the cosolvent, propylene carbonate was added in a 1:1 ratio. These tests were carried out using 1 mole of LiCF₃SO₃ as the electrolyte salt in a liter of the solvent(s).

In view of the success achieved by the addition of propylene carbonate, further tests were carried out using other solvents. As mentioned previously, 1,2-dimethoxyethane and 1,3-dioxolane have been used in lithium cells. These cells have a safety problem in view of the flammability of the solvents. Tests were carried out to determine whether a small amount of these additional cosolvents and propylene carbonate would improve the operation of cells using the electrolytes employing the diol-ester and ether-ester compounds of the present invention. Several combinations of the cosolvents were tested and found to be effective. However, an arbitrary limit of 30% by volume was set for the ether component of the cosolvent in order to maintain a low flammability for the overall electrolyte solvent. Tests were carried out with the following range of materials. As a result of these tests, it was determined that the following compositions (expressed as volume ratios) gave the best overall performance for the electrolyte solvent:

```
30:15:55 DME:PC:EtOEtOAc
30:25:45 DIOX:PC:EtOEtOAc
30:40:30 DME:PC:EGDiOAc
30:25:45 DIOX:PC:EGDiOAc
```

Generally, the cell performance was slightly better for the propylene carbonate: dimethoxyethane mixture with ethylene glycol diacetate or 2-ethoxyethyl acetate, then for the corresponding propylene carbonate:dioxolane electrolytes. It was clear from the testing that a range of effective cosolvent compositions is available and Applicant does not wish to be bound to the preferred compositions, as these are just that, preferred compositions, and the materials making up the electrolyte solvent can be varied while still producing effective electrolyte solvents.

AA-size jellyroll Li/FeS$_2$ cells were made with the following electrolytes:

```
30:40:30 EGDiOAc:PC:DME
30:40:30 EtOEtOAc:PC:DME
55:15:30 EtOEtOAc:PC:DME
```

All electrolytes contained 1 mole of LiCF$_3$SO$_3$ per liter of solvent. The cathode composition (about 4 per cell) was the same as that in the experimental cell and was coated onto both sides of an aluminum foil substrate. The anode was lithium foil (0.006 inch thick, 0.95 gram per cell). One layer of microporous polyethylene (0.001 inch thick) was employed as the separator. Total electrolyte content was about 2.2 grams per cell. These cells performed very well on standard 3.9-ohm continuous discharge tests, as shown in FIG. 1.

All of the materials used in the electrolyte solvents of the present invention are readily available commercially. A suitable commercial source for the diester materials and ether-ester materials is Aldrich Chemical Company.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. An electrochemical cell employing an anode of alkali or alkaline earth metals, a cathode material capable of forming a cell with said anode material, and a non-aqueous electrolyte solution, said non-aqueous electrolyte solution comprising an electrolyte solvent of the following general formula:

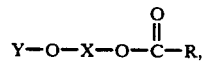

wherein
R is a C$_1$-C$_{10}$ alkyl group;
X is a C$_1$-C$_8$ acyclic group which can be linear, branched, saturated or unsaturated; and
Y is a C$_1$-C$_{10}$ alkyl group or a carbonyl group

in which R' is a C$_1$-C$_{10}$ alkyl group; and and electrolyte material soluble in said electrolyte solvent.

2. The electrochemical cell of claim 1, wherein in the non-aqueous electrolyte solution:
R is a C$_1$-C$_4$ alkyl group;
X is a C$_1$-C$_3$ acyclic group; and
Y is a C$_1$-C$_4$ alkyl group or a carbonyl group

in which R' is a C$_1$-C$_4$ alkyl group.

3. The electrochemical cell of claim 1, wherein in the non-aqueous electrolyte solution;
R is a methyl or ethyl alkyl group;
X is an alkylene group selected from methylene or ethylene; and
Y is a methyl or ethyl alkyl group or a methyl carbonyl or ethyl carbonyl group.

4. The electrochemical cell of claim 1, wherein said electrolyte solvent comprises ethylene glycol diacetate.

5. The electrochemical cell of claim 1, wherein said electrolyte solvent comprises methylene diacetate.

6. The electrochemical cell of claim 1, wherein said electrolyte solvent comprises 2-ethoxyethyl acetate.

7. The electrochemical cell of claim 1, wherein said electrolyte solvent includes a non-aqueous cosolvent.

8. The electrochemical cell of claim 2, wherein said non-aqueous cosolvent is propylene carbonate.

9. The electrochemical cell of claim 7, wherein said non-aqueous cosolvent is a mixture of propylene carbonate and an ether cosolvent.

10. The electrochemical cell of claim 9, wherein said ether cosolvent is dimethoxythane.

11. The electrochemical cell of claim 9, wherein said ether cosolvent is 1,3-dioxolane.

12. The electrochemical cell of claim 1, wherein said soluble electrolyte material is an alkali metal salt.

13. The electrochemical cell of claim 1, wherein said soluble electrolyte material is an alkaline earth metal salt.

14. The electrochemical cell of claim 12, wherein said alkali metal salt is LiCF$_3$SO$_3$.

15. The electrochemical cell of claim 12, wherein said alkali metal salt is LiBF$_4$.

16. The electrochemical cell of claim 1, wherein the anode is comprised of lithium.

17. The electrochemical cell of claim 15, wherein the anode is comprised of lithium.

* * * * *